US012647837B2

(12) United States Patent　　　　(10) Patent No.:　US 12,647,837 B2
Gupta et al.　　　　　　　　　　　(45) Date of Patent:　　Jun. 2, 2026

(54) SYSTEMS AND METHODS FOR HANDOVER FROM NON-STANDALONE COVERAGE TO STANDALONE COVERAGE WHILE MAINTAINING SESSION CONTINUITY

(71) Applicant: Verizon Patent and Licensing Inc., Basking Ridge, NJ (US)

(72) Inventors: Darshan Gupta, Irving, TX (US); Ranjan Sharma, New Albany, OH (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 316 days.

(21) Appl. No.: 18/441,401

(22) Filed: Feb. 14, 2024

(65) Prior Publication Data
US 2025/0261050 A1　　Aug. 14, 2025

(51) Int. Cl.
*H04Q 7/20*　　　　(2006.01)
*H04W 36/00*　　　(2009.01)
*H04W 36/14*　　　(2009.01)

(52) U.S. Cl.
CPC ........ *H04W 36/0011* (2013.01); *H04W 36/14* (2013.01)

(58) Field of Classification Search
CPC ............. H04W 36/0011; H04W 36/14; H04W 28/0925; H04W 36/0016; H04W 36/0023; H04W 36/0085; H04W 36/385
See application file for complete search history.

(56) References Cited

U.S. PATENT DOCUMENTS

| | | | |
|---|---|---|---|
| 12,335,836 B2 * | 6/2025 | Shekhar ................ | H04W 40/36 |
| 2023/0379775 A1 * | 11/2023 | Dauneria .......... | H04W 36/0011 |
| 2025/0081139 A1 * | 3/2025 | Barawkar ............... | H04W 8/24 |

* cited by examiner

*Primary Examiner* — Tuan Pham

(57)　　　　ABSTRACT

In some implementations, a network device may transmit user equipment (UE) route selection (URSP) rules during a registration of a UE with a non-standalone (NSA) network, wherein the URSP rules exclude network slicing related rules based on a lack of network slicing support in the NSA network. The network device may transmit, in response to a handover of the UE from the NSA network to a standalone (SA) network that supports network slicing, updated URSP rules during a registration of the UE with the SA network, wherein the updated URSP rules include a flag in each rule that controls the mode of migration of ongoing session(s) at the UE from the NSA network to the SA network during mobility procedures.

20 Claims, 10 Drawing Sheets

100

102:

104:

106:

108:

300

| Application group | Applications | Enumeration value | Description |
|---|---|---|---|
| Games | Game1, Game2, Game3 | "MAINTAIN_PDUSESSION" | Maintain the PDU session |
| Work | Teleconference1, Teleconference2, Teleconference3 | "RECONNECT_PDUSESSION" | Disconnect the PDU session with a reactivation request |
| General | Browsing | "RELEASE_PDUSESSION" | Disconnect PDU session without reactivation request |

FIG. 3

| Information | Category | PCF permission to modify in URSP | Scope |
|---|---|---|---|
| RSD precedence | Mandatory | Yes | UE context |
| RSD components | Mandatory | Yes | UE context |
| SSC Mode Selection | Optional | Yes | UE context |
| Mobility Disposition | Optional | Yes | PDU context |
| Network Slice Selection | Optional | Yes | UE context |
| ... | ... | ... | ... |

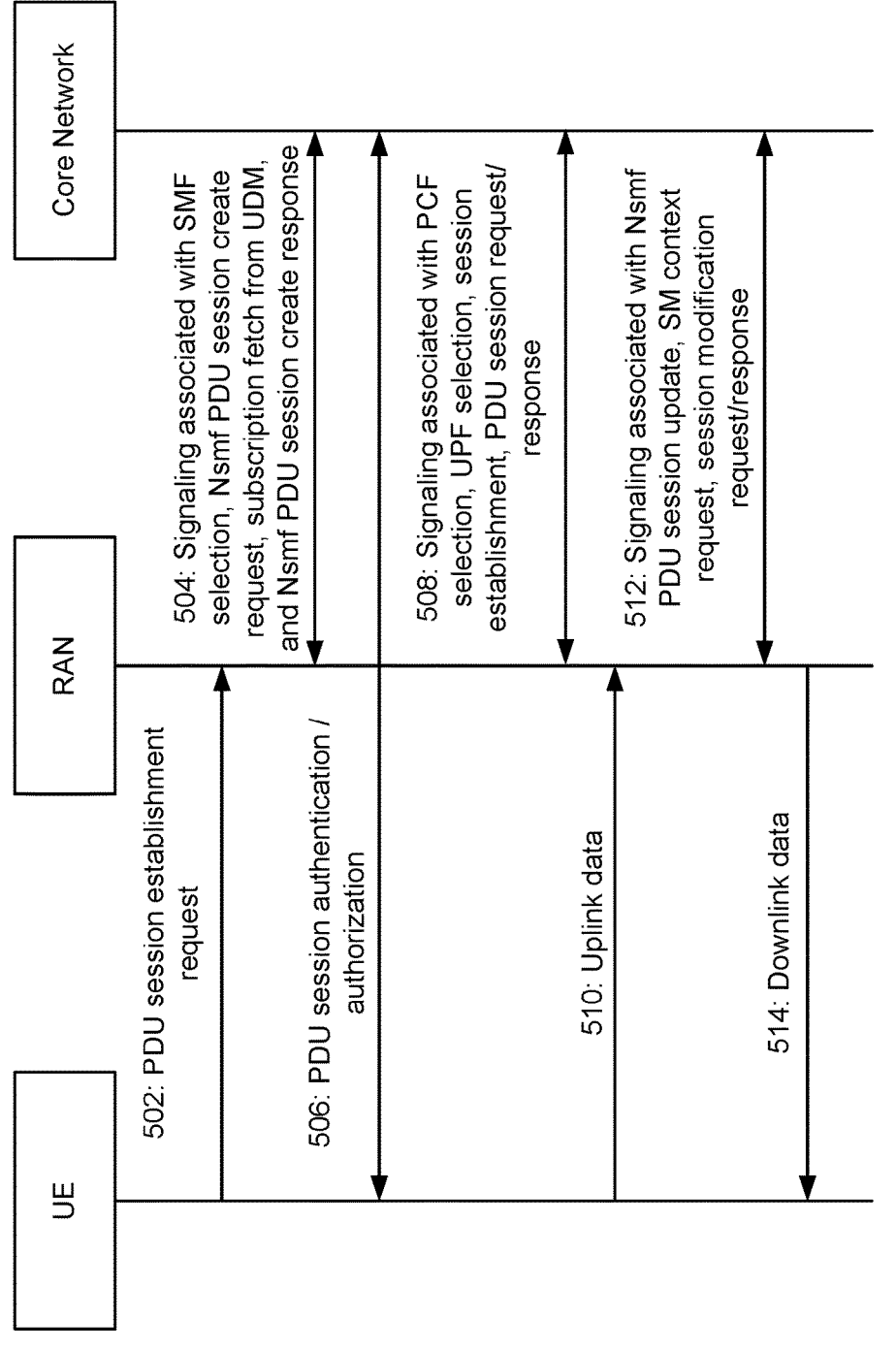

RAN

Core Network

502: PDU session establishment request

504: Signaling associated with SMF selection, Nsmf PDU session create request, subscription fetch from UDM, and Nsmf PDU session create response 506: PDU session authentication / authorization 508: Signaling associated with PCF selection, UPF selection, session establishment, PDU session request/ response 510: Uplink data 512: Signaling associated with Nsmf PDU session update, SM context request, session modification request/response 514: Downlink data Transmit, by a network device, user equipment (UE) route selection (URSP) rules during a registration of a UE with a non-standalone (NSA) network

1010

Transmit, by the network device and in response to a handover of the UE from the NSA network to a standalone (SA) network that supports network slicing, updated URSP rules during a registration of the UE with the SA network

1020

1000

SYSTEMS AND METHODS FOR HANDOVER FROM NON-STANDALONE COVERAGE TO STANDALONE COVERAGE WHILE MAINTAINING SESSION CONTINUITY

BACKGROUND

Wireless communication systems are widely deployed to provide various telecommunication services such as telephony, video, data, messaging, and broadcasts. A wireless network may include one or more network nodes that support communication for wireless communication devices.

BRIEF DESCRIPTION OF THE DRAWINGS

FIG. 3 is a diagram of an example associated with packet data unit (PDU) session continuity indicators.

FIG. 4 is a diagram of an example associated with user equipment route selection policy (URSP) rules.

FIG. 5 is a diagram of an example associated with a UE starting a PDU session.

DETAILED DESCRIPTION OF EXAMPLE EMBODIMENTS

Figure 1:
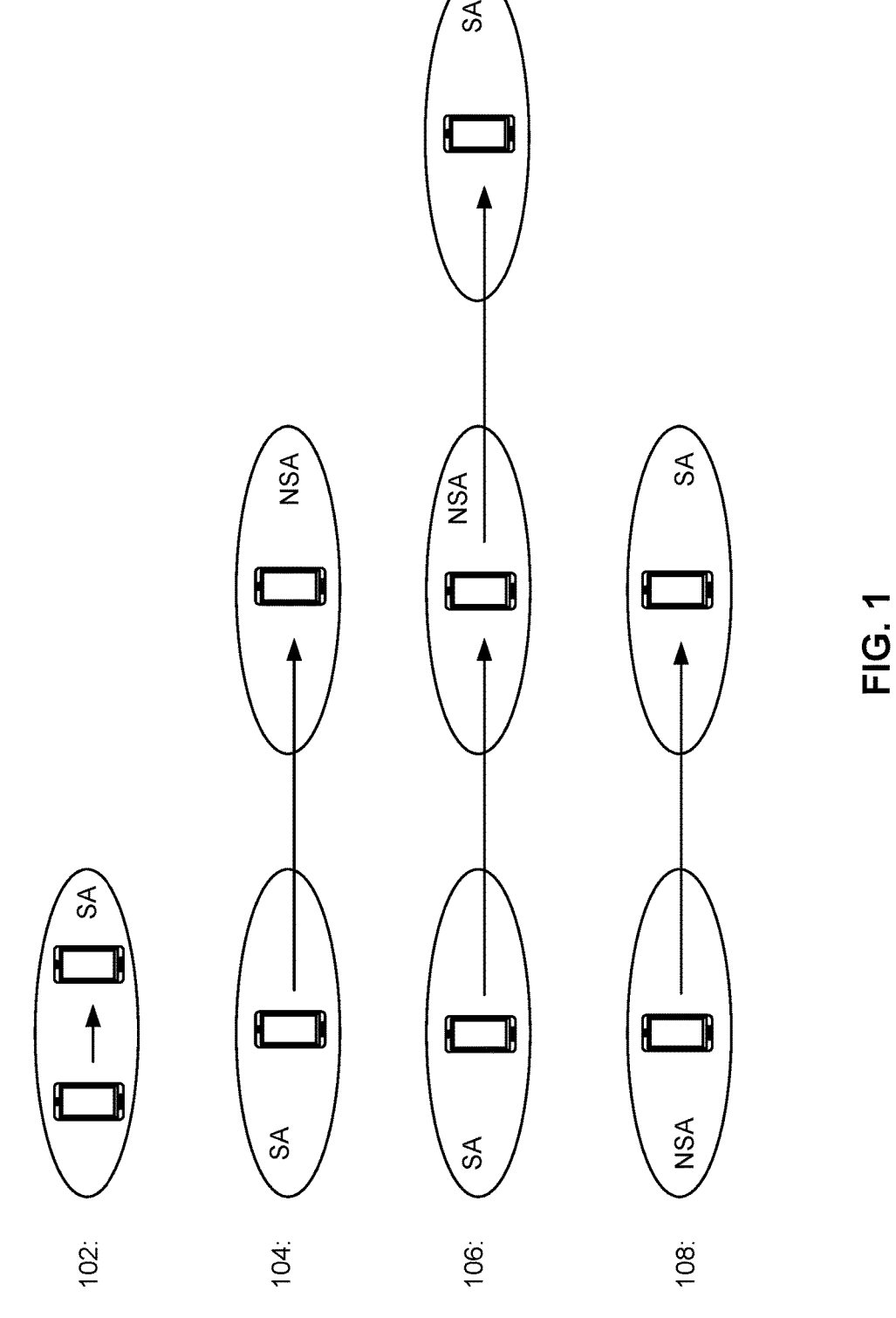
FIG. 1 is a diagram of an example associated with mobility scenarios.

The following detailed description of example implementations refers to the accompanying drawings. The same reference numbers in different drawings may identify the same or similar elements.

Network slicing, such as fifth generation (5G) slicing, may be applied for applications that could benefit from customized slice characteristics in providing a low-latency, better jitter, and higher priority treatment of data packets that result in an overall better user experience. Such applications may be associated with entertainment (e.g., online games), mission-critical surveillance, and/or monitoring, and may serve a wide variety of end user segments (e.g., gamers or first responders). Network slicing may be a feature of an SA network, such as a 5G SA network. Network slicing may allow a single physical network to be divided into multiple logical entities, which may or may not share underlying resources, and may be configured differently to handle requirements from different application types. Each network slice may be associated with key performance indicators (KPIs) that provide a customized approach to supporting desired performance characteristics for each application domain. The KPIs may be related to network slice reliability, latency, throughput, security, coverage, mobility, and/or cost profile.

As 5G deployment progresses, a number of UEs may still use a fourth generation (4G) spectrum and should be supported in the network. An NSA network, such as a 5G NSA network, may provide support to these UEs. In this case, an evolved Node B or eNB may associate with a 5G New Radio (NR) node or gNB when a 4G UE is capable of dual connectivity.

An NSA network may not provide some of the advanced features of an SA network, which may include network slicing. Mobility may be an issue for subscribers that sign up for being served by a differential treatment (e.g., low jitter, low latency, better error rates, and/or better throughput) inherent to a specialized slice within the SA network as UEs associated with the subscribers roam into the NSA network. This issue may be addressed by providing a suitable access point name (APN) with similar treatment as the subscriber would experience within the SA network while connecting to an equivalent data network name (DNN). However, another issue may occur when a subscribed UE commences a session in the NSA network and then roams into the SA network. The UE may not receive the desired treatment from a slice associated with the SA network, even when the slice is available in the area in which the UE is present. A workaround may involve rebooting the UE, or entering an airplane mode and then exiting the airplane mode, to force the network to provide the UE with the subscribed or preferential slice treatment. However, this workaround may not be acceptable because customers may not be willing to undertake such measures.

In some implementations, a UE that commences a session in an NSA network may first register with an eNB (e.g., a 4G eNB) using a Long Term Evolution (LTE) radio access technology (RAT). As part of a registration process, the NSA network may push traffic steering rules, such as URSP rules, to the UE. Since the NSA network does not support slicing, the URSP rules may not contain any slice-related rules. The URSP rules may contain information on a specific APN or APNs, and such information may be used by the UE to connect to one of the APNs. Subsequently, when the UE moves to an SA coverage area (e.g., a 5G SA coverage area) of an SA network, the UE may register with a gNB (e.g., a 5G gNB) using an NR RAT. As part of the subsequent registration, the UE may provide information to the SA network associated with requested network slices, a PDU session status, a list of PDU sessions to be activated, a UE policy container including a UE operating system identifier, and/or indications related to URSP rules support. The subsequent registration may include an indication by the UE to the SA network regarding whether the registration is of type "initial" or "mobility update." The subsequent registration may trigger the SA network (e.g., a core network) to provide an updated set of URSP rules to the UE. The UE may examine its ongoing PDU sessions, and map those to the updated set of URSP rules provided by the SA network. For session continuity, assuming an initial session was started with session and service continuity (SSC) Mode 3, the UE may continue to receive packets from two user plane functions (UPFs). The UE may taper off from communicating with an old UPF and divert communication traffic completely to a new UPF based on a flag associated with URSP rules.

In some implementations, the UE may obtain session/service continuity when the UE roams from NSA coverage to SA coverage (e.g., a 5G NSA coverage to a 5G SA coverage) that has a subscribed slice availability. The SA network may have subscribed slice availability, whereas the NSA network may not have subscribed slice availability. By achieving the service continuity when the UE roams from NSA coverage to SA coverage, the UE may not need to be rebooted, which may save resources at the UE as well as help improve a user experience. The session continuity may be provided by triggering the UE to take action via the flag indicated as part of the URSP rules instantiated by the SA network, thereby providing a seamless experience to ongoing sessions that have been initiated prior to roaming into the SA network coverage area. The session continuity for one or more ongoing sessions may be on a per-application basis instead of a per-UE basis.

FIG. 1 is a diagram of an example 100 associated with mobility scenarios. As shown by reference number 102, in an SA-to-SA mobility (e.g., 5G SA to 5G SA), a UE may first register in an SA network, start a PDU session, and then move within a coverage provided by the SA network based on an intra radio access technology (RAT) (intra-RAT) mobility. As long as the UE's subscription slice is available on gNBs within the SA network, slice-specific treatment and session continuity may be provided to the UE.

As shown by reference number 104, in an SA-to-NSA mobility (e.g., 5G SA to 5G NSA), a UE may first register in an SA network, start a PDU session, and then move out of coverage of the SA network and into NSA coverage based on an inter-RAT mobility. As part of this movement, the UE may register with an NSA network, in which a control and data bearer may be provided by an LTE eNB, and when the UE indicates dual-connectivity capability, the eNB may involve an NR gNB to provide radio data bearer functionality to the UE. A core network may be based on LTE technology. Since the NSA network does not support slicing, as part of a registration to the network, URSP rules may be provided to the UE with APNs, where the UE may be able to connect to such APNs. The UE may be provided with one or more APNs that exhibit similar quality of service (QOS) characteristics to the UE's subscription slice(s), which may ensure that a similar user experience is provided to the UE as when the UE is in the SA coverage area. For example, a slice in the SA network with a set of characteristics indicated by a 5G QoS indicator (5QI) may be matched with its nearest set of KPIs available in the NSA network and corresponding APN(s) may be pushed to the UE at the time of registration.

As shown by reference number 106, in an SA-to-NSA-to-SA mobility (e.g., 5G SA to 5G NSA to 5G SA), a UE may first register in an SA network, start a PDU session, and then roam into NSA coverage. After a period of time, the UE may roam back into SA coverage. In this case, the UE may obtain session characteristics, as would be the case in an NSA network, that would lead to a degraded experience.

As shown by reference number 108, in an NSA-to-SA mobility (e.g., 5G NSA to 5G SA), the UE may first register in an NSA network, start a session, and then roam into an SA coverage area. The UE may be provided with session characteristics that are similar to those provided in an NSA coverage, even when the UE has subscribed to a slice providing better performance.

In some implementations, session continuity with proper session treatment may be needed when a UE comes from NSA coverage to SA coverage. In other words, proper session treatment may be needed when the UE enters (or re-enters) the SA coverage, having previously been in the NSA coverage.

As indicated above, FIG. 1 is provided as an example. Other examples may differ from what is described with regard to FIG. 1. The number and arrangement of devices shown in FIG. 1 are provided as an example. In practice, there may be additional devices, fewer devices, different devices, or differently arranged devices than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) shown in FIG. 1 may perform one or more functions described as being performed by another set of devices shown in FIG. 1.

Figure 2:
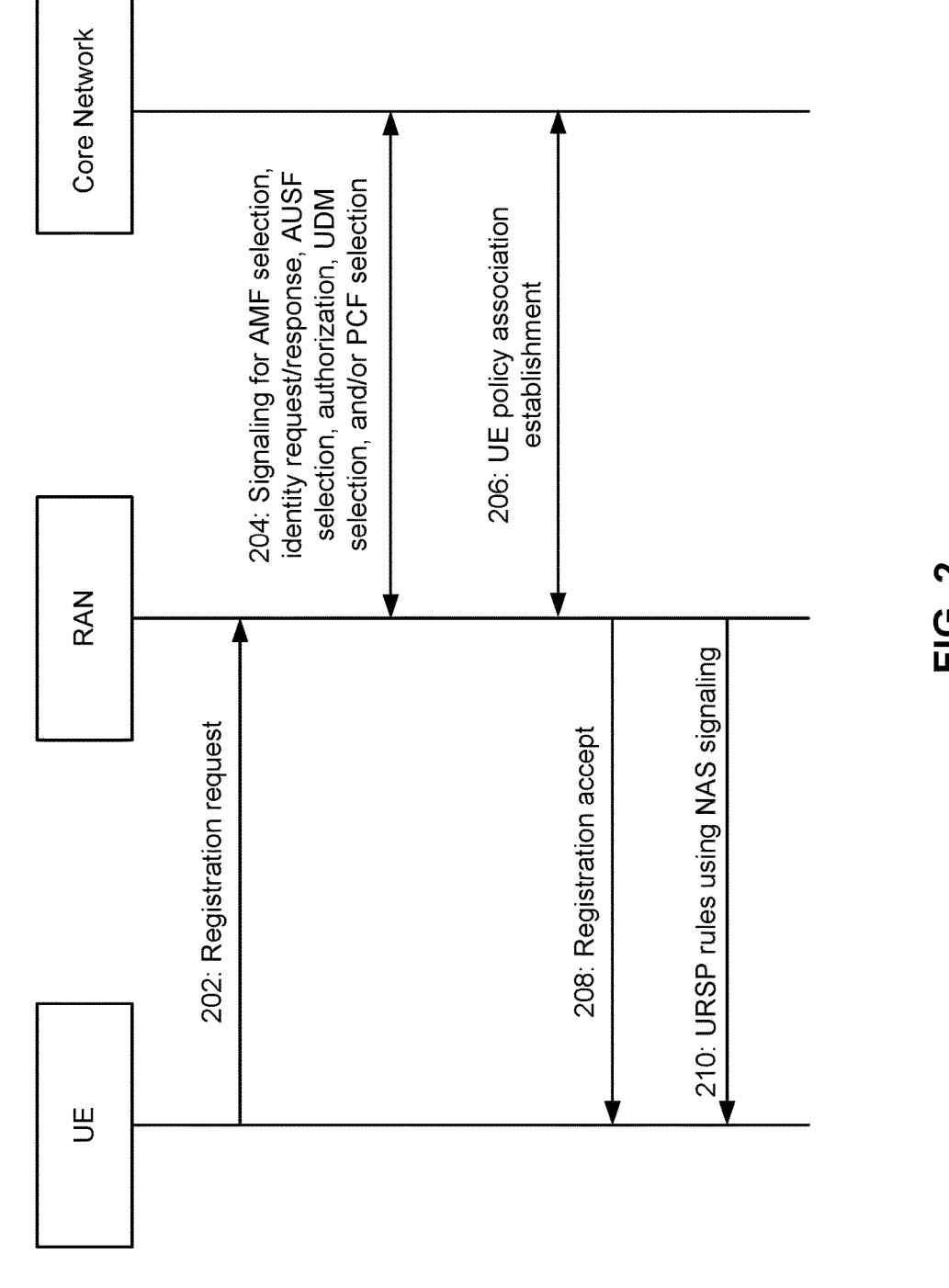
FIG. 2 is a diagram of an example associated with a user equipment (UE) registration at a home public land mobile network (PLMN) with standalone (SA) coverage.

FIG. 2 is a diagram of an example 200 associated with a UE registration at a home PLMN with SA coverage. As shown in FIG. 2, example 200 includes a UE (e.g., UE 802), a radio access network (RAN) (e.g., RAN 804), and a core network (e.g., core network 806).

As shown by reference number 202, the UE may transmit a registration request to the RAN. As shown by reference number 204, the RAN and the core network may exchange signaling associated with an application management function (AMF) selection, an identity request/response, an authentication server function (AUSF) selection, authorization, a unified data management (UDM) selection, and/or a policy and control function (PCF) selection. As shown by reference number 206, the RAN and the core network may exchange signaling associated with a UE policy association establishment. As shown by reference number 208, the RAN may send a registration accept to the UE. As shown by reference number 210, the RAN may convey, to the UE, URSP rules using non-access stratum (NAS) signaling.

In some implementations, at a first registration with a home PLMN under SA coverage (e.g., a registration with a home SA network), a UE subscription and/or entitlements may be fetched from a UDM, and URSP rules may be conveyed to the UE. Each UE subscription stored in the UDM may determine whether the UE is allowed to maintain, reconnect, and/or drop a PDU (or packet data network (PDN)) session upon inter-RAT mobility as an enumerated value. A per-UE subscription means that a scope of applicability may be at the UE level, such that all sessions may be handled the same way for the UE. A scope of "PDU session continuity at inter RAT mobility" (or "PDN continuity at inter-RAT mobility") may be modified from being a single enumeration type that applies to the UE to a per "application group" type enumeration, such that the enumeration may apply to one or more applications defined within an application group.

In some implementations, the first registration at the home PLMN with SA coverage may be associated with an SA-to-NSA-to-SA mobility. For an NSA-to-SA mobility, registration may occur in an NSA network and URSP rules obtained from a home PLMN may be downloaded onto the UE, but the URSP rules may not be applicable in the NSA network.

As indicated above, FIG. 2 is provided as an example. Other examples may differ from what is described with regard to FIG. 2. The number and arrangement of devices shown in FIG. 2 are provided as an example. In practice, there may be additional devices, fewer devices, different devices, or differently arranged devices than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) shown in FIG. 2 may perform one or more functions described as being performed by another set of devices shown in FIG. 2.

FIG. 3 is a diagram of an example 300 associated with PDU session continuity indicators.

As shown in FIG. 3, assuming three application groups defined for a set of UEs as games, work, and general, various dispositions for the PDU session continuity indicators may be defined. For example, an application group of "games" may have an enumeration value of "MAINTAIN_PDUSES-SION" for maintaining a PDU session, an application group of "work" may have an enumeration value of "RECON-NECT_PDUSESSION" for disconnecting a PDU session with a reactivation request, and an application group of "General" may have an enumeration value of "RELEASE_PDUSESSION" for disconnecting a PDU session without a reactivation request.

As indicated above, FIG. 3 is provided as an example. Other examples may differ from what is described with regard to FIG. 3. The number and arrangement of devices shown in FIG. 3 are provided as an example. In practice, there may be additional devices, fewer devices, different devices, or differently arranged devices than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) shown in FIG. 3 may perform one or more functions described as being performed by another set of devices shown in FIG. 3.

FIG. 4 is a diagram of an example 400 associated with URSP rules.

In some implementations, URSP rules may be enhanced to include a new data type related to mobility disposition. The new data type may be added as an optional information element (IE) for reasons of backward compatibility. This IE may enable the UE to understand and implement handling around ongoing PDU (or PDN) sessions.

As shown in FIG. 4, URSP rules may include route selection descriptor (RSD) precedence information associated with UE context, RSD component information associated with UE context, SSC mode selection information associated with UE context, mobility disposition information associated with PDU context, and network slice selection information associated with UE context.

In some implementations, the mobility disposition may be set by a core network when a UE subscription has one or more PDU session continuity indicators associated with application groups that indicate "MAINTAIN_PDUSES-SION" or "RECONNECT_PDUSESSION". The mobility disposition may not be set by the core network when the UE subscription only contains "RELEASE_PDUSESSION".

In some implementations, the URSP rules may set up an SSC mode of communication as Mode 1, Mode 2, or Mode 3. Since Mode 1 may rely on providing service and session continuity based on an Internet Protocol (IP) address provided by an originating network, Mode 1 may not be considered optimal for mobility usage, so Mode 2 and Mode 3 may be used in conjunction with a mobility disposition value set in the URSP rules. For the "Games" application group, the URSP rule may indicate SSC Mode 3, which may not cause a break in the session and instead provide a session continuity. For the "Work" applications group, the URSP rule may indicate SSC Mode 2, which may provide slice-specific treatment with potentially a minimal break in the session continuity. Further, the mobility disposition may be associated with an enumerated data type and may be labeled as "Session-priority" or "Slice-priority".

In some implementations, the UE may save the URSP rules received at registration with the home PLMN, and the UE may subsequently overwrite these URSP rules with updated URSP rules only from the home PLMN. In other words, URSP rules received in a visited PLMN may not overwrite original URSP rules received in the home PLMN. However, while the UE is in the visiting PLMN, the UE may follow rules provided to the UE during registration in the visiting PLMN, while still keeping the original URSP rules for later use upon return to the home PLMN.

As indicated above, FIG. 4 is provided as an example. Other examples may differ from what is described with regard to FIG. 4. The number and arrangement of devices shown in FIG. 4 are provided as an example. In practice, there may be additional devices, fewer devices, different devices, or differently arranged devices than those shown in FIG. 4. Furthermore, two or more devices shown in FIG. 4 may be implemented within a single device, or a single device shown in FIG. 4 may be implemented as multiple, distributed devices. Additionally, or alternatively, a set of devices (e.g., one or more devices) shown in FIG. 4 may perform one or more functions described as being performed by another set of devices shown in FIG. 4.

FIG. 5 is a diagram of an example 500 associated with a UE starting a PDU session. As shown in FIG. 5, example 500 includes a UE (e.g., UE 802), a RAN (e.g., RAN 804), and a core network (e.g., core network 806).

As shown by reference number 502, the UE may transmit a PDU session establishment request to the RAN. As shown by reference number 504, the RAN and the core network may exchange signaling associated with a session management function (SMF) selection, a network slice management function (Nsmf) PDU session create request, a subscription fetch from a UDM, and an Nsmf PDU session create response. As shown by reference number 506, the UE and the core network may exchange signaling associated with a PDU session authentication and/or authorization. As shown by reference number 508, the RAN and the core network may exchange signaling associated with a PCF selection, a UPF selection, a session establishment (e.g., an SMF may request the UPF for session establishment), and a PDU session request/response. As shown by reference number 510, the UE may transmit first uplink data, which may be for a UPF. As shown by reference number 512, the RAN and the core network may exchange signaling associated with an Nsmf PDU session update, a session management (SM) context request, and a session modification request/response (e.g., an SMF and the UPF may exchange the session modification request/response). As shown by reference number 514, the UE may receive first downlink data, which may be from the UPF.

In some implementations, when the UE starts two PDU sessions, one related to application group "Games" and another related to the application group "Work", the PDU session establishment may contain, among sent IEs, a requested SSC mode, which may be different for these two sessions. For any application under the "Games" category, the UE may send a PDU session establishment request with the requested SSC mode set to 3. For any application under the "Work" category, the UE would send a PDU session establishment request with the requested SSC mode set to 2.

In some implementations, the UE subscription/entitlement may be fetched from the UDM and the core network may verify that the UE is allowed to use the requested SSC modes. For both these PDU session establishment requests, a request type may be set to "Initial request".

In some implementations, for an NSA to SA mobility, the URSP rules may provide the UE with information on which APNs to use, as a DNN in an SA network may share the same names in an NSA network with equivalent APNs. For example, a UE modem may be allowed to run any "Games" application on APN-1, and any "Work" application on APN-2.

In some implementations, URSP rules may be application-specific and category-specific. Application categories and their association with specific flag values may allow the UE to determine that work-related applications are to obtain slice-priority treatment and game-related applications are to obtain session-priority treatment. However, specific work-related (or game-related) applications may be treated as exceptions, or may be provided with a treatment other than that is envisaged for the application category. In other words, the URSP rules may be application-specific and not just category-specific.

As indicated above, FIG. 5 is provided as an example. Other examples may differ from what is described with regard to FIG. 5. The number and arrangement of devices shown in FIG. 5 are provided as an example. In practice, there may be additional devices, fewer devices, different devices, or differently arranged devices than those shown in FIG. 5. Furthermore, two or more devices shown in FIG. 5 may be implemented within a single device, or a single device shown in FIG. 5 may be implemented as multiple, distributed devices. Additionally, or alternatively, a set of devices (e.g., one or more devices) shown in FIG. 5 may perform one or more functions described as being performed by another set of devices shown in FIG. 5.

Figure 6:
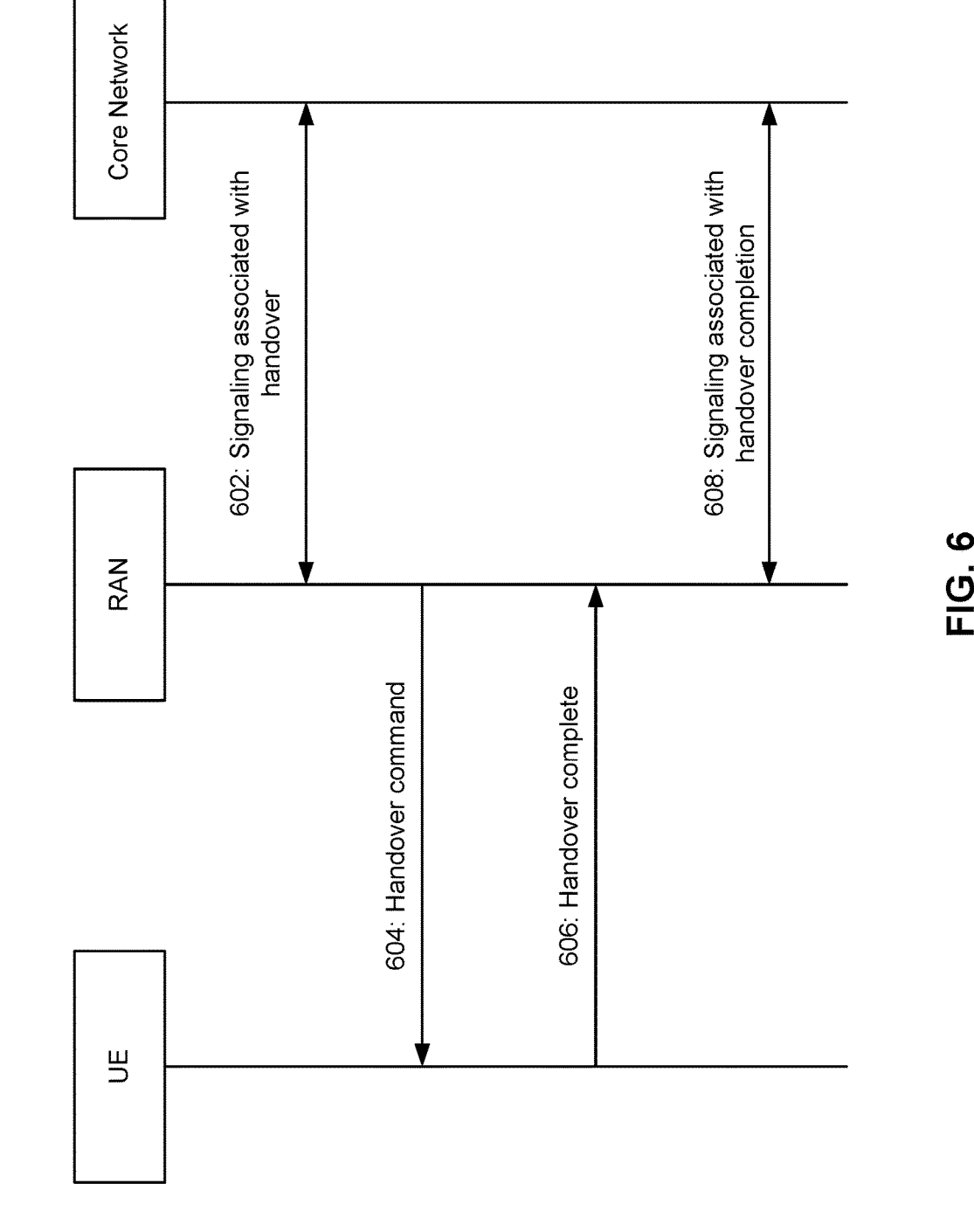
FIG. 6 is a diagram of an example associated with a UE roaming into non-standalone (NSA) coverage.

FIG. 6 is a diagram of an example 600 associated with a UE roaming into NSA coverage. As shown in FIG. 6, example 600 includes a UE (e.g., UE 802), a RAN (e.g., RAN 804), and a core network (e.g., core network 806).

As shown by reference number 602, the RAN and the core network may exchange signaling associated with handover. For example, the RAN may inform an AMF for handover. The AMF may obtain a PDU sessions context from an SMF and send a relocation request to a mobility management entity (MME). The MME may instruct a serving gateway (SGW) to create a session. The MME and an Evolved Universal Terrestrial Radio Access Network (E-UTRAN) may exchange handover request/acknowledgement signaling. The UE may respond to the AMF's relocation request. The AMF may instruct the SMF to update the PDU session context. The AMF may issue a handover command to the RAN. As shown by reference number 604, the RAN may transmit the handover command to the UE. As shown by reference number 606, the UE may transmit a handover complete message to the RAN. As shown by reference number 608, the RAN and the core network may exchange signaling associated with handover completion. For example, the E-UTRAN may send a handover complete notification to the MME. The MME may send a relocation complete notification to the AMF. The AMF may instruct the SMF to release the PDU session context. The SGW, the SMF, a packet gateway (PGW) may exchange bearer modification requests/responses. Further, the PGW may initiate a dedicated bearer activation.

In some implementations, when the UE roams into NSA coverage from SA coverage, ongoing PDU sessions in an SA network may have to be moved to an NSA network. For an operator providing both SA and NSA coverage, session treatments may be allowed that are similar (but not identical) to those provided by 5G slices, by selecting a matching 4G QoS class identifier (QCI). For example, some 5QIs may be defined with similar characteristics in 4G. 5QIs with guaranteed bit rates may include, for example, 1, 2, 3, 4, 65, 66, and 67. 5QIs with non-guaranteed bit rates may include, for example, 5, 6, 7, 8, 9, 69, 70, 79, and 80. 5QIs with delay-critical guaranteed bit rates may include 82, 83, 84, and 85, among others.

In some implementations, during UE mobility from a 5G system (5GS) to an evolved packet system (EPS) with N26 support, an SMF and/or a packet data network gateway control plane (PGW-C) may notify a PCF for a PDU session of a RAT type change, and the PCF may generate URSP rules that are conveyed to the UE when the PCF determines that an update to the URSP rules is needed for the UE. In some implementations, when the URSP rules are to be updated, the UE may save original URSP rules that were provided at the time of registration. The UE may not overwrite the original URSP rules with new URSP rules. In a visited PLMN, updated URSP rules may apply. Similar to the 5G SA case, an evolved packet core (EPC) may provide support for URSP rules, or alternatively, the UE may use a table for routing traffic that is queried by the UE modem. The UE may provide access to relocated sessions via choosing the corresponding QCIs in the NSA coverage. In some implementations, 5QIs may be correlated with QCIs on a uniform basis, where all UEs may map the QoS similarly, or via additional mapping that is applied on a per-UE basis or per-session basis. The additional mapping may allow for finer distinctions that may be tied to a UE subscription or individual sessions within a UE subscription.

As indicated above, FIG. 6 is provided as an example. Other examples may differ from what is described with regard to FIG. 6. The number and arrangement of devices shown in FIG. 6 are provided as an example. In practice, there may be additional devices, fewer devices, different devices, or differently arranged devices than those shown in FIG. 6. Furthermore, two or more devices shown in FIG. 6 may be implemented within a single device, or a single device shown in FIG. 6 may be implemented as multiple, distributed devices. Additionally, or alternatively, a set of devices (e.g., one or more devices) shown in FIG. 6 may perform one or more functions described as being performed by another set of devices shown in FIG. 6.

Figure 7:
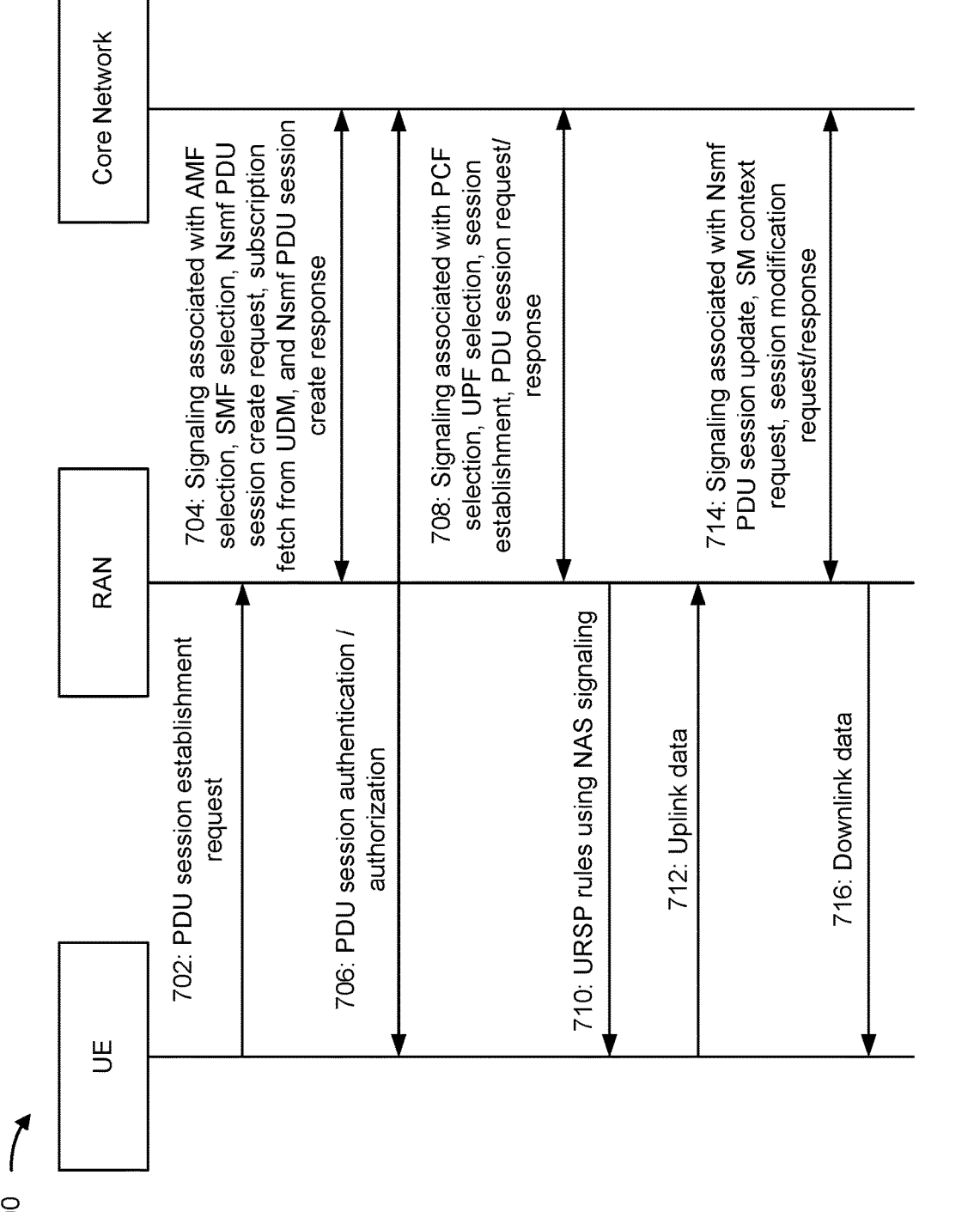
FIG. 7 is a diagram of an example associated with a UE roaming back into SA coverage and continuing with a PDU session.

FIG. 7 is a diagram of an example 700 associated with a UE roaming back into SA coverage and continuing with a PDU session. As shown in FIG. 7, example 700 includes a UE (e.g., UE 802), a RAN (e.g., RAN 804), and a core network (e.g., core network 806).

As shown by reference number 702, the UE may transmit a PDU session establishment request to the RAN. As shown by reference number 704, the RAN and the core network may exchange signaling associated with an AMF selection, an SMF selection, an Nsmf PDU session create request, a subscription fetch from a UDM, and an Nsmf PDU session create response. As shown by reference number 706, the UE and the core network may exchange signaling associated with a PDU session authentication and/or authorization. As shown by reference number 708, the RAN and the core network may exchange signaling associated with a PCF selection, a UPF selection, a session establishment (e.g., an SMF may request a UPF for session establishment), and a PDU session request/response. As shown by reference number 710, the RAN may convey, to the UE, URSP rules using NAS signaling. As shown by reference number 712, the UE may transmit first uplink data, which may be for the UPF. As shown by reference number 714, the RAN and the core network may exchange signaling associated with an Nsmf PDU session update, an SM context request, and a session modification request/response (e.g., an SMF and the UPF may exchange the session modification request/response). As shown by reference number 716, the UE may receive first downlink data, which may be from the UPF.

In some implementations, when the UE roams back into 5G SA coverage (e.g., the UE roams to a visiting SA network), as part of a mobility procedure, a handover may be initiated and the UE may connect to a 5G RAN. At this time, the UE may have two ongoing PDN sessions that were active in the 5G NSA. The UE may need to establish those two sessions with the 5G RAN as PDU sessions. For example, the UE may issue two PDU session establishment requests, one each for "games" and "work" PDU sessions. The PDU session establishment requests may each be set to request type "Existing PDU Sessions". A single network slice selection assistance information (S-NSSAI), an alternative S-NSSAI, and/or a UE-requested DNN may be included in the PDU session establishment request using saved URSP rules. When the UE had one or more additional PDU sessions running, with a session continuity indicator stating "disconnect", those PDU sessions may be discarded and not considered for new PDU session establishment. A requested SSC mode for the "games" and "work" PDU sessions may be set to SSC Mode 3 and SSC Mode 2, respectively, in the PDU session establishment requests.

In some implementations, the UE may save URSP rules received during a registration with a home SA network. The UE may be seeded with these URSP rules in the home SA network. The UE may not overwrite these URSP rules with URSP rules associated with the NSA network (not slice aware) or updated URSP rules associated with the visited SA network. The UE may use those URSP rules to request session continuation during NSA to SA mobility procedures. The URSP rules may provide the basis for the UE to request session continuation (or not) in a specific way for each of the ongoing sessions. When the UE comes back into SA coverage, the UE may provide NSSAIs and/or DNNs to which the UE is entitled. The core network may or may not grant all of those requested NSSAIs and/or DNNs based on the availability or entitlement or both in SA coverage area. When a requested S-NSSAI is not available at the visited SA network, the requested S-NSSAI may be substituted with another available slice in response to a registration request. The UE may conserve configured S-NSSAIs and use the S-NSSAIs as part of the requested S-NSSAIs at the time of registration in another PLMN, whereby the core network may look up the subscribed S-NSSAIs and respond with the allowed S-NSSAIs, which may or may not include slice substitutions upon unavailability of the requested slice.

As indicated above, FIG. 7 is provided as an example. Other examples may differ from what is described with regard to FIG. 7. The number and arrangement of devices shown in FIG. 7 are provided as an example. In practice, there may be additional devices, fewer devices, different devices, or differently arranged devices than those shown in FIG. 7. Furthermore, two or more devices shown in FIG. 7 may be implemented within a single device, or a single device shown in FIG. 7 may be implemented as multiple, distributed devices. Additionally, or alternatively, a set of devices (e.g., one or more devices) shown in FIG. 7 may perform one or more functions described as being performed by another set of devices shown in FIG. 7.

Figure 8:
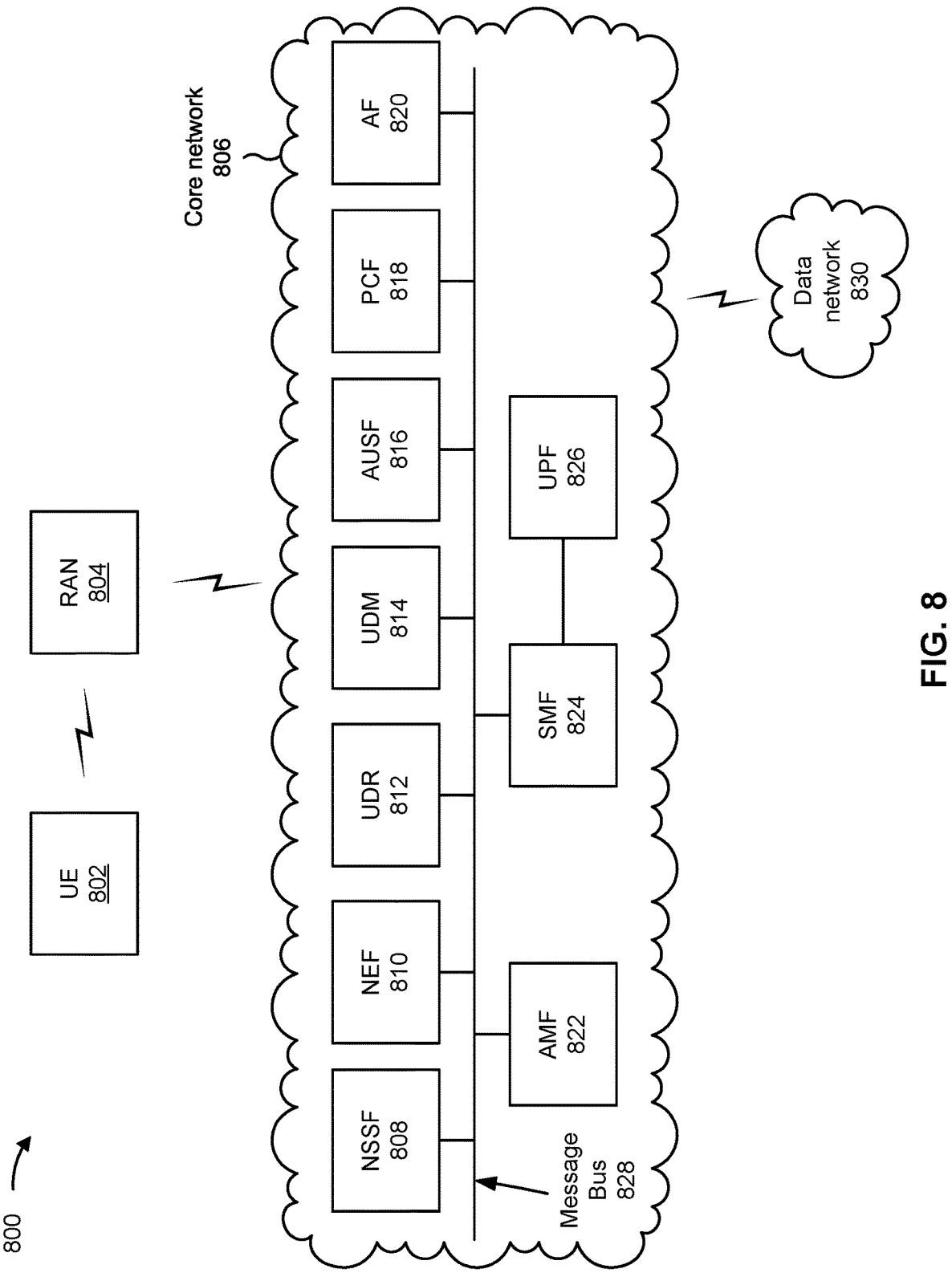
FIG. 8 is a diagram of an example environment in which systems and/or methods described herein may be implemented.

FIG. 8 is a diagram of an example environment 800 in which systems and/or methods described herein may be implemented. As shown in FIG. 8, example environment 800 may include a UE 802, a RAN 804, a core network 806, and a data network 830. Devices and/or networks of example environment 800 may interconnect via wired connections, wireless connections, or a combination of wired and wireless connections.

The UE 802 may include one or more devices capable of receiving, generating, storing, processing, and/or providing information, such as information described herein. For example, the UE 802 can include a mobile phone (e.g., a smart phone or a radiotelephone), a laptop computer, a tablet computer, a desktop computer, a handheld computer, a gaming device, a wearable communication device (e.g., a smart watch or a pair of smart glasses), a mobile hotspot device, a fixed wireless access device, customer premises equipment, an autonomous vehicle, or a similar type of device.

The RAN 804 may support, for example, a cellular radio access technology (RAT). The RAN 804 may include one or more base stations (e.g., base transceiver stations, radio base stations, node Bs, eNodeBs (eNBs), gNodeBs (gNBs), base station subsystems, cellular sites, cellular towers, access points, transmit receive points (TRPs), radio access nodes, macrocell base stations, microcell base stations, picocell base stations, femtocell base stations, or similar types of devices) and other network entities that can support wireless communication for the UE 802. A base station may be a disaggregated base station. The disaggregated base station may be configured to utilize a protocol stack that is physically or logically distributed among two or more nodes, which may include a radio unit (RU), a distributed unit (DU), and a centralized unit (CU). The RAN 804 may transfer traffic between the UE 802 (e.g., using a cellular RAT), one or more base stations (e.g., using a wireless interface or a backhaul interface, such as a wired backhaul interface), and/or the core network 806. The RAN 804 may provide one or more cells that cover geographic areas.

In some implementations, the RAN 804 may perform scheduling and/or resource management for the UE 802 covered by the RAN 804 (e.g., the UE 802 covered by a cell provided by the RAN 804). In some implementations, the RAN 804 may be controlled or coordinated by a network controller, which may perform load balancing, network-level configuration, and/or other operations. The network controller may communicate with the RAN 804 via a wireless or wireline backhaul. In some implementations, the RAN 804 may include a network controller, a self-organizing network (SON) module or component, or a similar module or component. In other words, the RAN 804 may perform network control, scheduling, and/or network management functions (e.g., for uplink, downlink, and/or side-link communications of the UE 802 covered by the RAN 804).

In some implementations, the core network 806 may include an example functional architecture in which systems and/or methods described herein may be implemented. For example, the core network 806 may include an example architecture of a 5G next generation (NG) core network included in a 5G wireless telecommunications system. While the example architecture of the core network 806 shown in FIG. 8 may be an example of a service-based architecture, in some implementations, the core network 806 may be implemented as a reference-point architecture and/or a 4G core network, among other examples.

As shown in FIG. 8, the core network 806 may include a number of functional elements. The functional elements may include, for example, a network slice selection function (NSSF) 808, a network exposure function (NEF) 810, a unified data repository (UDR) 812, a UDM 814, an authentication server function (AUSF) 816, a PCF 818, an application function (AF) 820, an AMF 822, an SMF 824, and/or a UPF 826. These functional elements may be communicatively connected via a message bus 828. Each of the functional elements shown in FIG. 8 is implemented on one or more devices associated with a wireless telecommunications system. In some implementations, one or more of the functional elements may be implemented on physical devices, such as an access point, a base station, and/or a gateway. In some implementations, one or more of the functional elements may be implemented on a computing device of a cloud computing environment.

The NSSF 808 may include one or more devices that select network slice instances for the UE 802. The NSSF 808 may allow an operator to deploy multiple substantially independent end-to-end networks potentially with the same infrastructure. In some implementations, each slice may be customized for different services. The NEF 810 may include one or more devices that support exposure of capabilities and/or events in the wireless telecommunications system to help other entities in the wireless telecommunications system discover network services.

The UDR 812 may include one or more devices that provide a converged repository, which may be used by network functions to store data. For example, a converged repository of subscriber information may be used to service a number of network functions. The UDM 814 may include one or more devices to store user data and profiles in the wireless telecommunications system. The UDM 814 may generate authentication vectors, perform user identification handling, perform subscription management, and perform other various functions. The AUSF 816 may include one or more devices that act as an authentication server and support the process of authenticating the UE 802 in the wireless telecommunications system.

The PCF 818 may include one or more devices that provide a policy framework that incorporates network slicing, roaming, packet processing, and/or mobility management, among other examples. The AF 820 may include one or more devices that support application influence on traffic routing, access to the NEF 810, and/or policy control, among other examples. The AMF 822 may include one or more devices that act as a termination point for NAS signaling and/or mobility management, among other examples. The SMF 824 may include one or more devices that support the establishment, modification, and release of communication sessions in the wireless telecommunications system. For example, the SMF 824 may configure traffic steering policies at the UPF 826 and/or may enforce UE internet protocol (IP) address allocation and policies, among other examples. The UPF 826 may include one or more devices that serve as an anchor point for intra-RAT and/or inter-RAT mobility. The UPF 826 may apply rules to packets, such as rules pertaining to packet routing, traffic reporting, and/or handling user plane QoS, among other examples. The message bus 828 may represent a communication structure for communication among the functional elements. In other words, the message bus 828 may permit communication between two or more functional elements.

The data network 830 may include one or more wired and/or wireless data networks. For example, the data network 830 may include an Internet Protocol multimedia subsystem (IMS), a public land mobile network (PLMN), a local area network (LAN), a wide area network (WAN), a metropolitan area network (MAN), a private network such as a corporate intranet, an ad hoc network, the Internet, a fiber optic-based network, a cloud computing network, a third party services network, an operator services network, and/or a combination of these or other types of networks.

The number and arrangement of devices and networks shown in FIG. 8 are provided as an example. In practice, there may be additional devices and/or networks, fewer devices and/or networks, different devices and/or networks, or differently arranged devices and/or networks than those shown in FIG. 8. Furthermore, two or more devices shown in FIG. 8 may be implemented within a single device, or a single device shown in FIG. 8 may be implemented as multiple, distributed devices. Additionally, or alternatively, a set of devices (e.g., one or more devices) of example environment 800 may perform one or more functions described as being performed by another set of devices of example environment 800.

Figure 9:
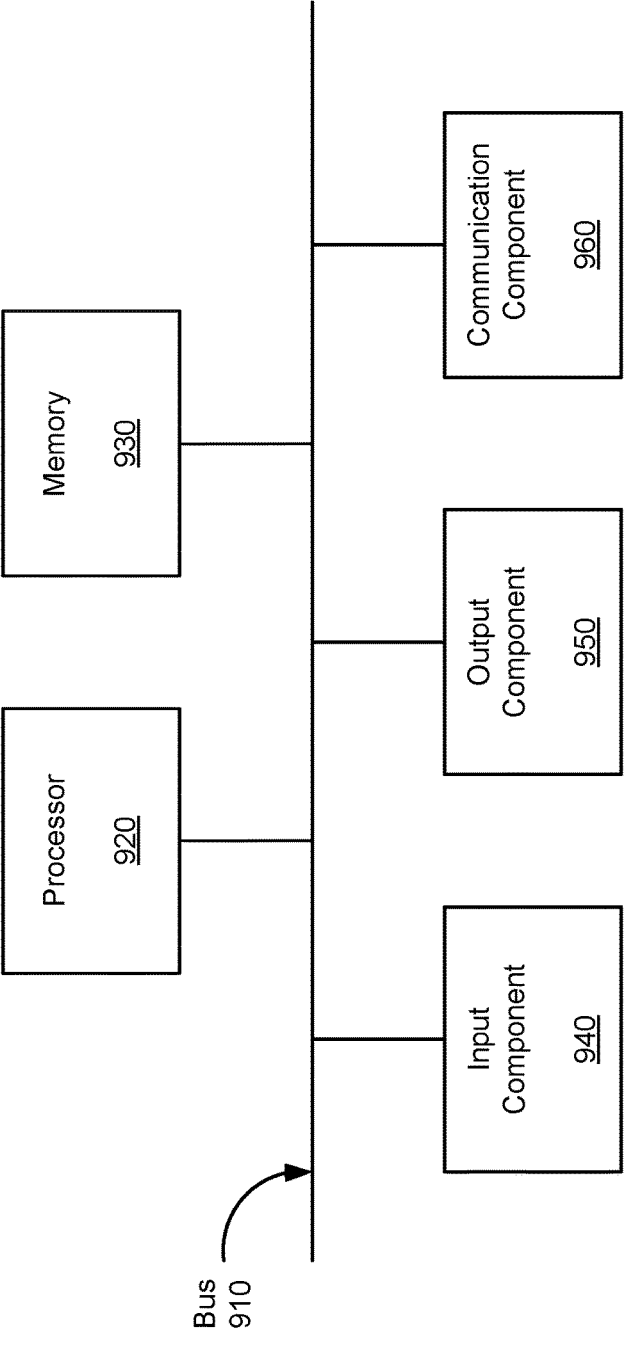
FIG. 9 is a diagram of example components of one or more devices of FIG. 8.

FIG. 9 is a diagram of example components of a device 900 associated with maintaining session continuity when a UE roams between an NSA network and an SA network. The device 900 may correspond to a network device (e.g., a network device in core network 806). In some implementations, the network device may include one or more devices 900 and/or one or more components of the device 900. As shown in FIG. 9, the device 900 may include a bus 910, a processor 920, a memory 930, an input component 940, an output component 950, and/or a communication component 960.

The bus 910 may include one or more components that enable wired and/or wireless communication among the components of the device 900. The bus 910 may couple together two or more components of FIG. 9, such as via operative coupling, communicative coupling, electronic coupling, and/or electric coupling. For example, the bus 910 may include an electrical connection (e.g., a wire, a trace, and/or a lead) and/or a wireless bus. The processor 920 may include a central processing unit, a graphics processing unit, a microprocessor, a controller, a microcontroller, a digital signal processor, a field-programmable gate array, an application-specific integrated circuit, and/or another type of processing component. The processor 920 may be implemented in hardware, firmware, or a combination of hardware and software. In some implementations, the processor 920 may include one or more processors capable of being programmed to perform one or more operations or processes described elsewhere herein.

The memory 930 may include volatile and/or nonvolatile memory. For example, the memory 930 may include random access memory (RAM), read only memory (ROM), a hard disk drive, and/or another type of memory (e.g., a flash memory, a magnetic memory, and/or an optical memory). The memory 930 may include internal memory (e.g., RAM, ROM, or a hard disk drive) and/or removable memory (e.g., removable via a universal serial bus connection). The memory 930 may be a non-transitory computer-readable medium. The memory 930 may store information, one or more instructions, and/or software (e.g., one or more software applications) related to the operation of the device 900. In some implementations, the memory 930 may include one or more memories that are coupled (e.g., communicatively coupled) to one or more processors (e.g., processor 920), such as via the bus 910. Communicative coupling between a processor 920 and a memory 930 may enable the processor 920 to read and/or process information stored in the memory 930 and/or to store information in the memory 930.

The input component 940 may enable the device 900 to receive input, such as user input and/or sensed input. For example, the input component 940 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 950 may enable the device 900 to provide output, such as via a display, a speaker, and/or a light-emitting diode. The communication component 960 may enable the device 900 to communicate with other devices via a wired connection and/or a wireless connection. For example, the communication component 960 may include a receiver, a transmitter, a transceiver, a modem, a network interface card, and/or an antenna.

The device 900 may perform one or more operations or processes described herein. For example, a non-transitory computer-readable medium (e.g., memory 930) may store a set of instructions (e.g., one or more instructions or code) for execution by the processor 920. The processor 920 may execute the set of instructions to perform one or more operations or processes described herein. In some implementations, execution of the set of instructions, by one or more processors 920, causes the one or more processors 920 and/or the device 900 to perform one or more operations or processes described herein. In some implementations, hardwired circuitry may be used instead of or in combination with the instructions to perform one or more operations or processes described herein. Additionally, or alternatively, the processor 920 may be configured to perform one or more operations or processes described herein. Thus, implementations described herein are not limited to any specific combination of hardware circuitry and software.

The number and arrangement of components shown in FIG. 9 are provided as an example. The device 900 may include additional components, fewer components, different components, or differently arranged components than those shown in FIG. 9. Additionally, or alternatively, a set of components (e.g., one or more components) of the device 900 may perform one or more functions described as being performed by another set of components of the device 900.

Figure 10:
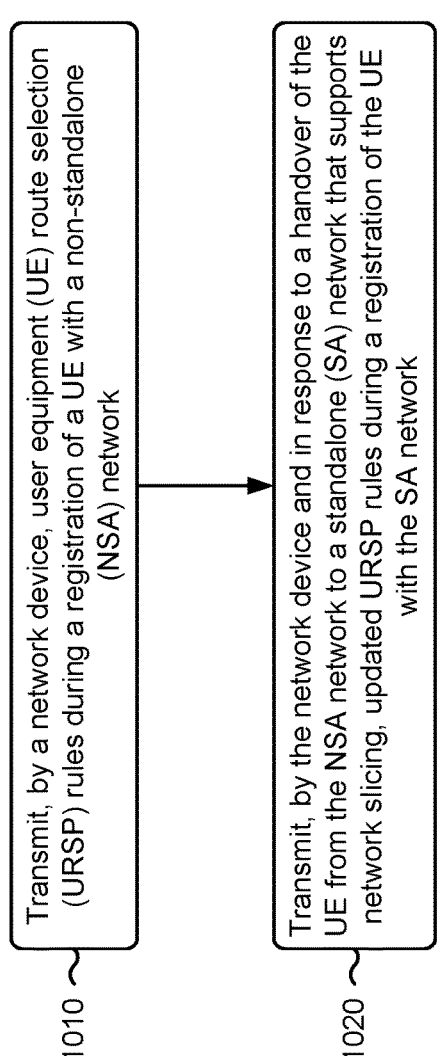
FIG. 10 is a flowchart of an example process associated with maintaining session continuity when a UE roams between an NSA network and an SA network.

FIG. 10 is a flowchart of an example process 1000 associated with controlling data transfers for UEs in high density areas. In some implementations, one or more process blocks of FIG. 10 may be performed by a network device. In some implementations, one or more process blocks of FIG. 10 may be performed by another entity or a group of entities separate from or including the network device. Additionally, or alternatively, one or more process blocks of FIG. 10 may be performed by one or more components of device 900, such as processor 920, memory 930, input component 940, output component 950, and/or communication component 960.

As shown in FIG. 10, process 1000 may include transmitting, by the network device, URSP rules during a registration of a UE with an NSA network (block 1010). The URSP rules may exclude network slicing related rules. An exclusion of the network slicing related rules may be based on a lack of network slicing support in the NSA network.

As shown in FIG. 10, process 1000 may include transmitting, by the network device and in response to a handover of the UE from the NSA network to an SA network that supports network slicing, updated URSP rules during a registration of the UE with the SA network (block 1020). The updated URSP rules may include a flag in each rule that controls a mode of migration of one or more ongoing sessions at the UE from the NSA network to the SA network during mobility procedures. The flag may cause the session of the UE to be migrated from a first UPF associated with the NSA network to a second UPF associated with the SA network while maintaining session continuity. The session may be an ongoing session that was initiated prior to the UE roaming into an SA network coverage area. The session continuity may be maintained during the handover of the UE from the NSA network to the SA network, and network slicing may be provided by the SA network without rebooting the UE.

In some implementations, the network device may receive, from the UE, information regarding a requested network slice, a PDU session status, a list of PDU sessions to be activated, a UE policy container including a UE OS identifier, and/or an indication related to URSP rules support. The updated URSP rules may be based on the information. The network device may receive, from the UE, an indication that the registration of the UE with the SA network is associated with an initial registration or a mobility update registration. In some implementations, the network device may transmit, based on a PDU session establishment request in connection with the UE roaming into the SA network, an Nsmf PDU session create response. A PDN session that is active in the NSA network may be established as a PDU session in the SA network based on the Nsmf PDU session create response. The PDU session establishment request may be based on URSP rules associated with the SA network and S-NSSAI.

Although FIG. 10 shows example blocks of process 1000, in some implementations, process 1000 may include additional blocks, fewer blocks, different blocks, or differently arranged blocks than those depicted in FIG. 10. Additionally, or alternatively, two or more of the blocks of process 1000 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

When "a processor" or "one or more processors" (or another device or component, such as "a controller" or "one or more controllers") is described or claimed (within a single claim or across multiple claims) as performing multiple operations or being configured to perform multiple operations, this language is intended to broadly cover a variety of processor architectures and environments. For example, unless explicitly claimed otherwise (e.g., via the use of "first processor" and "second processor" or other language that differentiates processors in the claims), this language is intended to cover a single processor performing or being configured to perform all of the operations, a group of processors collectively performing or being configured to perform all of the operations, a first processor performing or being configured to perform a first operation and a second processor performing or being configured to perform a second operation, or any combination of processors performing or being configured to perform the operations. For example, when a claim has the form "one or more processors configured to: perform X; perform Y; and perform Z," that claim should be interpreted to mean "one or more processors configured to perform X; one or more (possibly different) processors configured to perform Y; and one or more (also possibly different) processors configured to perform Z."

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
transmitting, by a network device, user equipment (UE) route selection (URSP) rules during a registration of a UE with a non-standalone (NSA) network, wherein the URSP rules exclude network slicing related rules based on a lack of network slicing support in the NSA network; and transmitting, by the network device and in response to a handover of the UE from the NSA network to a standalone (SA) network that supports network slicing, updated URSP rules during a registration of the UE with the SA network, wherein the updated URSP rules include a flag in each rule that controls a mode of migration of one or more ongoing sessions at the UE from the NSA network to the SA network during mobility procedures.

2. The method of claim 1, wherein the SA network is a visited SA network, and further comprising:
transmitting, by the network device, URSP rules during a registration with a home SA network, wherein the URSP rules include configured single network slice selection assistance informations (S-NSSAIs) that are locally saved at the UE and not overwritten by the URSP rules associated with the NSA network and the updated URSP rules associated with the visited SA network.

3. The method of claim 2, wherein a requested S-NSSAI is not available at the visited SA network, and the requested S-NSSAI is substituted with another available slice in response to a registration request.

4. The method of claim 2, wherein the URSP rules are application-specific and category-specific, the flag is useable in conjunction with one or more SSC modes to impart specific treatment to individual applications within each category, and flag values associated with application categories allow for session priority or slice priority.

5. The method of claim 2, wherein the URSP rules are associated with a selection of a session and service continuity (SSC) mode, and the SSC mode is one of SSC mode 1, SSC mode 2, or SSC mode 3.

6. The method of claim 1, wherein a session continuity for the one or more ongoing sessions is on a per-application basis instead of a per-UE basis.

7. The method of claim 1, wherein equivalent access point names (APNs) in the NSA network and data network names (DNNs) in the SA network are defined to facilitate session mobility and provide equivalent session treatment.

8. The method of claim 1, further comprising:
receiving, by the network device, information regarding one or more of: a requested network slice, a packet data unit (PDU) session status, a list of PDU sessions to be activated, a UE policy container including a UE operating system (OS) identifier, or an indication related to URSP rules support, wherein the updated URSP rules is based on the information, and the updated URSP rules are interpreted by the UE to detect changes in relation to URSP rules associated with a home SA network.

9. The method of claim 1, further comprising:
receiving, by the network device, an indication that the registration of the UE with the SA network is associated with an initial registration or a mobility update registration.

10. The method of claim 1, wherein session continuity is maintained during the handover of the UE from the NSA network to the SA network and network slicing is provided by the SA network without rebooting the UE.

11. The method of claim 1, further comprising:
transmitting, by the network device and based on a packet data unit (PDU) session establishment request in connection with the UE roaming into the SA network, a network slice management function (Nsmf) PDU session create response, wherein the Nsmf PDU session create response causes a packet data network (PDN) session that is active in the NSA network to be established as a PDU session in the SA network, the PDU session establishment request is based on URSP rules associated with the SA network and single network slice selection assistance information (S-NSSAI), and a PDU/PDN session continuity is changed from per-UE to per-session.

12. The method of claim 1, wherein the one or more ongoing sessions are migrated from a first user plane function (UPF) associated with the NSA network to a second UPF associated with the SA network while maintaining session continuity.

13. The method of claim 1, wherein the session is an ongoing session that was initiated prior to the UE roaming into an SA network coverage area.

14. A network device, comprising:
one or more processors configured to:
transmit equipment (UE) route selection (URSP) rules during a registration of a UE with a non-standalone (NSA) network, wherein the URSP rules exclude network slicing related rules based on a lack of network slicing support in the NSA network; and
transmit, in response to a handover of the UE from the NSA network to a standalone (SA) network that supports network slicing, updated URSP rules during a registration of the UE with the SA network, wherein the updated URSP rules include a flag in each rule that controls a mode of migration of one or more ongoing sessions at the UE from the NSA network to the SA network during mobility procedures.

15. The network device of claim 14, wherein the one or more processors are further configured to:
receive information regarding one or more of: a requested network slice, a packet data unit (PDU) session status, a list of PDU sessions to be activated, a UE policy container including a UE operating system (OS) identifier, or an indication related to URSP rules support, wherein the updated URSP rules is based on the information.

16. The network device of claim 14, wherein the one or more processors are further configured to:

receive an indication that the registration of the UE with the SA network is associated with an initial registration or a mobility update registration.

17. The network device of claim 14, wherein session continuity is maintained during the handover of the UE from the NSA network to the SA network and network slicing is provided by the SA network without rebooting the UE, and the session is an ongoing session that was initiated prior to the UE roaming into an SA network coverage area.

18. The network device of claim 14, wherein the one or more processors are further configured to:
transmit, based on a packet data unit (PDU) session establishment request in connection with the UE roaming into the SA network, a network slice management function (Nsmf) PDU session create response, wherein the Nsmf PDU session create response causes a packet data network (PDN) session that is active in the NSA network to be established as a PDU session in the SA network, and the PDU session establishment request is based on URSP rules associated with the SA network and single network slice selection assistance information (S-NSSAI).

19. The network device of claim 14, wherein the one or more ongoing sessions are migrated from a first user plane function (UPF) associated with the NSA network to a second UPF associated with the SA network while maintaining session continuity.

20. A non-transitory computer-readable medium storing a set of instructions, the set of instructions comprising:
one or more instructions that, when executed by one or more processors of a network device, cause the network device to:
transmit equipment (UE) route selection (URSP) rules during a registration of a UE with a non-standalone (NSA) network, wherein the URSP rules exclude network slicing related rules based on a lack of network slicing support in the NSA network; and
transmit, in response to a handover of the UE from the NSA network to a standalone (SA) network that supports network slicing, updated URSP rules during a registration of the UE with the SA network, wherein the updated URSP rules include a flag in each rule that controls a mode of migration of one or more ongoing sessions at the UE from the NSA network to the SA network during mobility procedures.

* * * * *